April 21, 1936. H. BOLAS Re. 19,932

AIRCRAFT

Original Filed Dec. 31, 1931 3 Sheets-Sheet 1

INVENTOR
HAROLD BOLAS

BY Harris Mathews.
ATTORNEY.

April 21, 1936. H. BOLAS Re. 19,932

AIRCRAFT

Original Filed Dec. 31, 1931 3 Sheets-Sheet 2

INVENTOR
HAROLD BOLAS

BY
Harris, Mattern.
ATTORNEY.

April 21, 1936. H. BOLAS Re. 19,932

AIRCRAFT

Original Filed Dec. 31, 1931 3 Sheets-Sheet 3

Inventor
HAROLD BOLAS

By

Attorney

Reissued Apr. 21, 1936 Re. 19,932

UNITED STATES PATENT OFFICE 19,932

AIRCRAFT

Harold Bolas, Providence, R. I.

Original No. 1,933,307, dated October 31, 1933, Serial No. 584,214, December 31, 1931. Application for reissue May 16, 1935, Serial No. 21,834

10 Claims. (Cl. 244—14)

The present invention relates to improvements in aircraft and is a continuation in part of my application for aircraft, now abandoned, filed November 7, 1930, Serial Number 493,965. My improvements have particular application in the type of aircraft in which it has been proposed to reduce the stalling or lowest flying speed by causing the propeller slip stream to act over the main supporting surface to produce substantial lift.

It has been heretofore proposed in this connection to dispose a number of propellers along the leading edge of the wing in such manner that the slip stream acted on the major portion of the wing or main lifting surface. It has also been proposed to enable aircraft to hover and ascend and descend vertically by various helicopter arrangements in which the plane of rotation of the propellers is substantially horizontal, the upward thrust directly supporting the weight of the machine. In these arrangements the slip stream is thrown entirely clear of the control surfaces, if these are situated in the normal position, and hence control of the usual type cannot be resorted to.

It has been further proposed to provide airscrews having a fixed inclination to the body so as to have upward and forward components of thrust upon the wing or main lifting surfaces, the angle of which was adjustable, but in this case the fore and aft and directional control surfaces were entirely clear of the slip stream and adequate control at slow forward speeds by such means was not possible. Moreover in the high speed or low incidence condition, depending on the angular position of the wing, either the rear part of the body or fuselage would be cocked up at an attitude leading to excessive parasitic resistance, or the propellers themselves would be inclined to the flight path at a large angle, resulting in reduction of propulsive force and excessive vibration.

It has also been proposed to provide a single central engine and propeller pivotally mounted in the nose of the body or fuselage, and controllable in flight to change the angle of the axis of rotation. In the slow speed condition the propeller was pivoted upwards to have upward and forward components of thrust, while at the same time a small portion of the lifting surface disposed in the slip stream and pivoted relatively to the body was acted upon by the slip stream to produce extra lift. In this case also the fore and aft and directional control surfaces were clear of the slip stream and adequate control became impossible while at the same time the extra lift derived from the movable lifting surface in the slip stream was of a relatively small order.

Among the objects of my invention are to reduce the minimum flying speed to a value below that obtaining in present heavier-than-air aircraft while retaining usual top speed characteristics, to reduce the stalling speed in still air to substantially zero, causing the machine to hover, while still retaining adequate control and the usual top speed characteristics, and to sustain an increased total weight per horse power in hovering, low speed, and top speed flight, so that a substantial useful load can be carried. Another object is to provide an aircraft which can descend steeply to a landing, or ascend steeply from a confined space, while retaining the usual top speed characteristics of normal aircraft.

Other objects are to provide improved top speed characteristics while retaining the same stalling speed and load carrying capacity of normal aircraft, to obtain an increase in useful load carrying capacity while retaining the same top speed and low speed characteristics of normal aircraft, and to provide improvements over normal aircraft in stalling speed, top speed and useful load carrying capacity.

With the above and other objects in view embodiments of my invention are shown in the accompanying drawings, and these embodiments will be hereinafter more fully described with reference thereto and the invention will be finally pointed out in the claims.

In the drawings.

Similar reference characters indicate corresponding parts throughout the several figures of the drawings.

Figure 1:
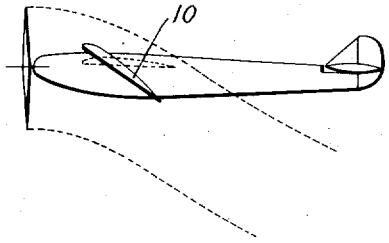
Figs. 1 to 4 are comparative diagrammatic side elevational views of airplanes in flight, Figs. 1 and 2 showing two previously known designs, and Figs. 3 and 4 showing a design according to the present invention.

In Fig. 1 of the drawings there is shown diagrammatically an airplane of previously known type, in which the wing unit 10 can be swiveled relatively to the fuselage to present a large angle of attack to the slip stream in the slow speed condition as shown in full lines. In this case the slip stream is diverted downwards by the wing, producing upward lift, but in so doing is thrown clear of the stabilizer and rudder, and hence adequate control is impossible by this means.

Figure 2:
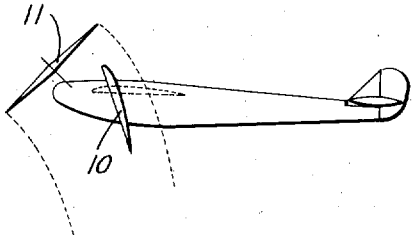

In Fig. 2 another previously known design is shown diagrammatically, in which the axis of the propeller 11 is adjustable upwards in relation to the fuselage, so that the thrust of the propeller has components upwards and forwards. The wing 10, as in the design shown in Fig. 1, is adjustable so as to present a positive angle of attack to the slip stream and thus assist in producing upward lift. Here again the slip stream completely misses the stabilizer and rudder and adequate control by normal means becomes impossible. If only the propeller is swivelled, the wing remaining at a small angle to the fuselage, as shown in dotted lines, the slip stream acts at a negative angle to the wing and a downward force is produced acting in opposition to the upward component of thrust of the propeller, and hence little or no useful gain results.

Figure 3:
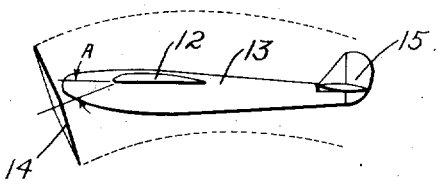

In Fig. 3 I have shown diagrammatically an airplane design, according to one embodiment of my invention, in which the wing 12 is fixed rigidly to the fuselage 13 and the propeller 14 is so arranged that its axis presents a positive angle of attack in relation to the wing. In this case it will be seen that the slip stream after passing over the wing also impinges upon the auxiliary control surfaces, i. e. stabilizer, elevator, fin and rudder, indicated generally as 15, and hence adequate and complete control by slip stream action becomes practicable.

Figure 4:
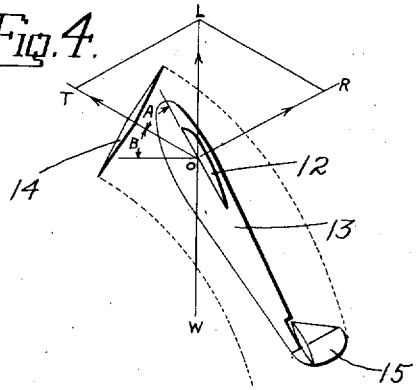

The attitude of the aircraft to the horizontal, as shown in Fig. 3, would not represent a state of equilibrium at low forward speeds and when under low speed conditions the machine would assume a position such as shown in Fig. 4. In this diagram OT represents the thrust of the propeller, OR the total resultant force on the machine produced by the slip stream action, and OW the weight of the machine acting downwards. The force OL acting upwards is that due to the combination of OT and OR, and in the illustrated arrangement of my invention this is equal in magnitude to OW, thus producing a state of equilibrium. It will be observed that a proportion of the total lift is derived from the upward component of the propeller thrust, and the remainder from the action of the air stream on the airplane proper—chiefly on the main lifting surface. Also that the forward acting component of thrust is balanced by the backward component of drag.

In comparing the design shown in Fig. 2 and that of the present invention shown in Fig. 4 it will be seen that in the latter case the control surfaces lie in the path of the air flow from the wing, and hence at little or no forward speed the machine is under complete control when employing the usual auxiliary surfaces, i. e., stabilizer and elevator, fin and rudder. In the Fig. 2 design, on the other hand, the control surfaces are clear of the path of the slip stream, and as before pointed out adequate control is impossible.

If it is assumed that the angle "A" between the wing and propeller axis is fixed, then this angle should not be excessive, but should be decided by considerations which will be described. In the low speed condition, Fig. 4, the angle B—the inclination of the propeller axis to the horizontal—is for a given aerofoil section and arrangement, dependent upon the angle A, and should also not be excessive. The combined angle A plus B represents approximately the angle of the body or fuselage to the horizon.

The effect of the angle "A" between wing and airscrew axis is worthy of consideration. In normal design practice it is customary to so dispose propeller axis and wing cord such that the propeller axis is approximately horizontal in the cruising or high speed attitude, in which case the propeller axis and wing chord are more or less parallel to each other.

In order that the effect of the angle "A" may be clearly appreciated it is first necessary to give some consideration to the action of a propeller upon the air stream passing through it.

The air stream passing through a propeller disc accelerates in speed both before and after passing through the disc, this change in speed being due, of course, to the thrust of the propeller. The increase in air speed over and above the normal forward speed of the screw may be termed the slip speed, the slip speed being of a high order at low forward speed, and vice versa.

It follows that even at very low forward speeds a considerable total stream exists at points behind the propeller disc.

An airfoil suitably situated behind the propeller and immersed in the combined stream is subject to a greater lift than if the same airfoil at the same angle of attack is subjected to the action of a stream caused by the forward motion alone. When the forward speed is low and the slip stream value consequently high, the gain in lift expressed as a percentage, may be very great.

When the propeller disc is inclined to the direction of motion in such fashion that the propeller axis is inclined upwards and forwards, the final stream behind the propeller, in addition to being accelerated is also deflected downwards, the amount of such deviation increasing with increase of inclination of the propeller disc to the line of flight.

This deviation of the stream caused by a propeller having its axis inclined in an upward and forward direction, results in a reduction of the angle of attack of the combined stream on the wing, the amount of decrement being equal to the angle of deviation of the stream. As the angle of the airfoil to the flight path increases, the angle of the propeller axis to the flight path increases at the same rate, and in consequence, the angle of deviation also increases but at a somewhat slower rate.

Figure 4 may be regarded as applying to either the hovering or slow-speed condition, depending upon the attitude of the wing to the horizon, i. e. upon the magnitude of the total angle A B.

For any given speed in sustained horizontal flight, the necessary attitude of the wing (and hence the body) to the horizon is dependent upon the angle A, such attitude becoming increasingly steeper as the angle A is decreased. It, therefore, follows that a machine having its propeller arranged in conventional fashion, (i. e. with its axis substantially parallel to the wing chord) must present a much steeper angle to the horizon for a given horizontal flying speed than would a machine having its propeller arranged in the manner of Figure 4.

The advantages of the propeller disposition of Figure 4 as compared with a conventional arrangement may now be pointed out.

In the first place, by proper selection of the angle A the lift upon the machine at commencement of take off is considerably increased. Furthermore, the take off speed will be greatly reduced and hence the time and distance to take off will also be reduced, such being among the objects of the improvement.

The second point relates to the comfort of the occupants at low speed. Since the attitude of the body, or cabin, is approximately that of the wing, it follows that the slow speed attitude will not differ greatly from that experienced when standing on the ground, and this will not prove uncomfortable. With the propellers arranged in conventional fashion such is not the case. The body is inclined upwards at a considerable angle to the horizon, and serious discomfort for the occupants must ensue.

Another point relates to the inclination of the motors to the horizon in slow speed flight. Normal carbureters cease to function well when steeply inclined from their ordinary or horizontal position, and hence carbureter trouble may be expected when the conventional angle between propeller axis and wing is adopted. A further important point concerns the control forces necessary to hold the machine in the slow speed attitude. Such control forces must be produced by the stabilizer and elevators, and even though the former may be provided with angular adjustment in excess of that normally found sufficient, the necessary control moments for slow speed flight can be much more readily produced when employing the propeller arrangement of Figure 4.

Another advantage arises from the relative inclinations of the propellers to the direction of motion. When a two-bladed propeller is so inclined a periodic side force is set up on the propeller shaft. This force is not of a serious order for reasonable angles of inclination such as would be required when employing the arrangement of Figure 4, but could be expected to set up objectionable vibrations where the conventional setting of propeller axis to wing chord is employed.

In cases where a fair proportion of the wing is unsubjected to slip stream (thus for instance of the order of 50%) the condition is not quite the same as that previously described. In this case the attitude of the wing to the horizon at minimum speed is the angle at which the unsubmerged portion becomes stalled, i. e. the stalling angle of the airfoil in an infinite stream.

We now find that the minimum speed possible when employing the arrangement of Figure 4 is less than that derived from the conventional arrangement, the amount of such speed reduction increasing as the angle A is increased. It thus follows, as in the previous case, that both the take off speed and run to take off are reduced by adopting the propeller arrangement of Figure 4.

When employing the setting of Figure 4, the propeller axes are inclined downwards and forwards in the high speed condition as will be seen by reference to Figure 3. In this condition, therefore, the propeller thrust exerts a downward component, and, in effect the apparent total weight of the machine is increased to this extent. This feature is an advantage by which the top speed may be increased when employing the angular setting called for at low speed. The reason is as follows.

In most aircraft the wing angle at top speed is less than that required for maximum wing efficiency (or ratio of load carried to wing drag). It follows that a purely hypothetical method of improving top speed would consist in providing a machine having a greater total weight at high speed than at low speed, in order that the wing may operate at an increased angle of attack in the high speed condition. The setting between propeller axes and wing shown in Figures 3 and 4 increases the virtual weight of the machine in the high speed condition by reason of the downward component of the thrust and hence increased top speed may be attained.

An important advantage of the propeller setting portrayed in Figure 4 as compared with the conventional arrangement lies in the fact that the combined stream behind the wing is raised to a relatively higher position, thus bathing the empennage, and enabling adequate control to be maintained at reduced forward speed, while maintaining the empennage in more or less conventional positioning in relation to the main wing.

In a preferred arrangement, therefore, the angle between propeller axis and wing chord is arranged as already described, with the principal objects of improving take off, reducing low speed, securing adequate control at such low speed, and increasing top speed.

It has so far been assumed that the angle existing between propeller axis and wing aerofoil is fixed and constant. If it is desired, however, to increase the lifting efficiency in the hovering or low speed attitude, and at the same time reduce the angle of the propeller axis to the horizontal under these conditions, the power units may be arranged to be pivotally attached to their mountings, and mechanism provided, such as hereinafter shown in detail, which will enable the angle A between the propeller axis and wing to be increased when passing from the low incidence or high speed condition to the high incidence or low speed condition.

I find it highly desirable in carrying out my invention to employ a propeller and engine design by which the static thrust per horse-power of the air-screw will be as large as possible when taking into consideration other limitations imposed by design. As is well known static thrust per horse-power depends upon diameter, revolutions per minute, pitch, blade thickness and shape, and for a given power, static thrust per horse power is greater when the revolutions per minute are reduced and the diameter of the air-screw is increased.

I preferably employ for this purpose a low speed engine or one having a reduction gear, the latter being desirable from a weight per horse power point of view. As the thrust horse power is greater the smaller the diameter of the individual air-screw, I preferably divide the total power available into as large a number of individual units as is compatible with other aspects of the design.

As before pointed out, the pitch of the air-screw blade is a factor in static thrust per horse power, and for high specific static thrust the pitch should be relatively small, thus enabling the air-screw to work at full engine revolutions, and under efficient conditions. A small pitch, however, would be undesirable under high speed conditions, and I therefore propose to employ a variable pitch air-screw, the pitch of which can be controlled in flight, thus enabling a reasonable weight per horse power to be maintained in hovering or low speed flight, while in no way impairing efficient high speed flight. Inasmuch as variable pitch propellers and mechanisms for controlling them in flight are well known I have not shown the pitch changing means, but it will be understood that any suitable type may be employed.

The air-screw blades should preferably have thin, efficient aerofoil sections, and should be a narrow in proportion to propeller diameter as strength considerations permit. Light alloy metal blades are suitable for the purpose.

From the foregoing it will be seen that in a preferred embodiment of my invention, capable of having a large ratio of high speed to low speed while carrying a substantial useful load, I propose to provide a plurality of propellers preferably of geared down type, and having their pitch variable in flight.

As regards the wing unit, the individual aerofoils comprising this should be arranged to present a positive angle of attack to the air-screw slip stream, and the greater this angle of attack, the smaller will be the angle of the air-screw axis to the horizon in the low speed and hovering or low speed condition. The conditions under which the aerofoil system functions are different from those obtaining in the case of normal aircraft, in which the aerofoils are submerged in a stream of infinite depth, whereas in the present invention the aerofoils function in a mixed stream constituted partly of forward speed and partly of slipstream. It is therefore important in carrying out my invention that the aerofoil be capable of dealing with the major portion of the stream and of turning this through as large an angle as possible without stalling. To this end I propose, as will hereinafter be described in detail, to employ trailing edge flaps operable in flight, and under certain conditions to use slots or pilot planes, for example of the type known as Handley-Page. The trailing edge flaps in the case of employment of a fixed angle of incidence between the air-screw axis and wing, will enable this angle to be retained at a value which will not involve undue downward inclination of the air-screw axes in high speed flight. In operation the flaps are pulled downwards through a considerable angle in the hovering or low speed conditions and are readjusted to form the normal aerofoil when flying at high speed.

It is part of my invention that the combination of slip stream action on the wing, when properly arranged, together with already known means for varying aerodynamic characteristics produces valuable and unobvious advantages. If a basic wing having a specified surface loading is provided for instance with trailing edge flaps, a substantial reduction in minimum speed is obtained when the flaps are pulled down. Moreover a similar result ensues if the same basic airfoil is subjected, either wholly or in part, to the action of forward speed and slip stream.

At first sight it would seem that if a wing having a similar variable aerodynamic characteristic is combined with an equal submergence of slip stream, the resulting improvement should be comparable in amount with the sum of the separate improvements gained from the individual elements. It is part of my invention that such is not the case, the resultant gain from the combination being substantially greater.

To illustrate the point more clearly, figures for a numerical case, based upon wind channel tests, are given below. The first example deals with the case of 100% wing submergence, and the second treats of the case where 50% of the total area is subjected to slip stream action. The results may be taken as being comparatively correct, but not of necessity as representing the best which can be attained.

In both cases the lift contribution due to the upward forward inclination of the propeller axes is taken into account. The figures given are for an overall surface loading of 13.6 pounds per square foot, and a power loading of 9.1 pounds per horse power, the angle A in this instance being taken as 10°.

TABLE A

*100% Wing submergence*

| | Maximum lift coefficient | Minimum speed m. p. h. | Speed reduction from Case I, m. p. h. | Percentage speed reduction | Total percentage speed reduction |
|---|---|---|---|---|---|
| 1. Basic wing | 1.34 | 63.4 | ------ | ------ | ------ |
| 2. Basic wing with variable aerodynamic characteristics | 2.25 | 48.6 | 14.8 | 23.3 | |
| 3. Basic wing and slip stream | 2.52 | 46.1 | 17.3 | 27.3 | 50.6 |
| 4. Combined basic wing with variable aerodynamic characteristics and slipstream | 13.8 | 19.7 | 43.7 | ------ | 69.0 |

TABLE B

*50% Wing submergence*

| | Maximum lift coefficient | Minimum speed m. p. h. | Speed reduction from Case I, m. p. h. | Percentage speed reduction | Total percentage speed reduction |
|---|---|---|---|---|---|
| 1. Basic wing | 1.34 | 63.4 | ------ | ------ | ------ |
| 2. Basic wing with variable aerodynamic characteristics | 2.26 | 48.6 | 14.8 | 23.3 | |
| 3. Basic wing and slip stream | 1.97 | 52 | 11.4 | 18.0 | 41.3 |
| 4. Combined basic wing with variable aerodynamic characteristics and slip stream | 5.74 | 30.5 | 32.9 | ------ | 51.8 |

The above tables show the very valuable and unobvious improvements to be obtained by the combination of slip stream submergence with a wing having variable aerodynamic characteristics. It will also be noted that in the particular examples given a reduction in minimum speed of from about 52% to 69% can be achieved by adopting amounts of wing submergence varying between 50% and 100% of the total available area.

Now since damage or injury resulting from impact is directly proportional to kinetic energy, which is in turn proportional to the square of the forward speed, it can be truthfully argued that the danger in this respect can be reduced to from 23% to about 10% respectively of that incurred in the case of the basic wing. Now considering the relative effect of the amount of slip stream submergence upon the total lift coefficient attainable we have as follows for the surface and power loading already quoted:—

TABLE C

| Percentage coverage | Relative lift coefficient | Percentage improvement |
|---|---|---|
| 0 | 1 (Wing with variable aerodynamic characteristics.) | ------ |
| 50 | 2.54 | 154 |
| 100 | 6.14 | 514 |

It will be seen that the percentage improvement for the first 50% of coverage is 154, while for the second 50% the further percentage improvement is no less than 360.

In an actual machine I prefer to submerge at least 50% of my wing in the slip stream. The preferred arrangement, therefore, submerges the major portion of the wing and results in percentage improvements over the best variable camber and other such devices by at least 154%. The increase in lift may therefore be justly described as substantial.

It should be made clear that by 50% I mean an aerodynamic 50%, that is to say that portion of the area which affords one half the total lift obtained when the wing is presented at a given angle of attack in a relatively infinite stream. Thus in a wing where camber to chord ratio diminishes from center line to wing tip an aerodynamic 50% could be attained by a portion of the superficial area, which is in fact something less than 50% of the total superficial area.

In the case where the method of securing aerodynamic variability takes the form of trailing edge flaps, such flaps extend outwards from the body on each side, and hence are directly in the way of the tail group. It has been proposed in certain instances that aerodynamic variability should be avoided in this particular region. If this is done, however, a valuable portion of the aerodynamic variability is lost, and the total lift correspondingly reduced. It, therefore, constitutes improvement that the aerodynamic variability should be carried right in to the body on each side and in way of the tail group.

This provision does not lead to lack of control, or undue change of trim. When, for instance, the trailing edge flaps are pulled down, the center of pressure of the wing as a whole moves towards the rear, and hence increased downward load (or alternately reduced upward load) is required upon the horizontal tail surfaces. As, however, the downward movement of the flaps increases both camber and effective incidence of the wing, the air stream behind the wing is deflected further downwards, causing in consequence additional downward load on the tail of the correct nature to preserve trim.

Figure 5:
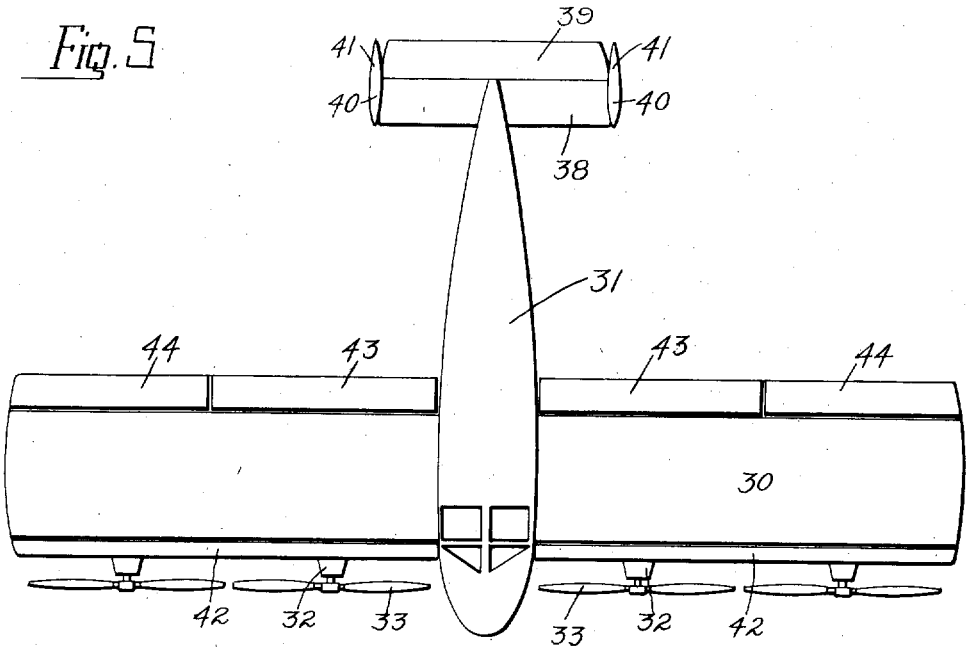
Fig. 5 is a plan view of an aircraft of monoplane type, according to one embodiment of my invention.
Figure 6:
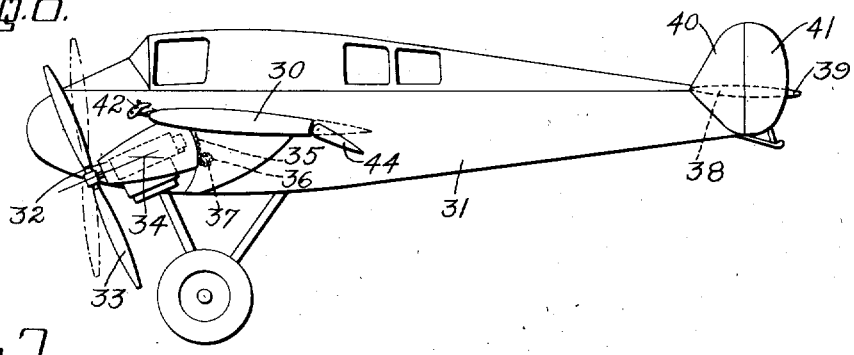
Fig. 6 is a side elevation thereof, and showing in dotted lines an adjusted position of the engine units and propellers.

In one embodiment of the invention, illustrated in Figs. 5 and 6, the wing unit comprises a monoplane structure 30 fixed to and extending at each side of the body or fuselage 31, having a number of engine units 32 arranged along the span or length of the wing, in such manner that the slip stream from the air-screws 33 embraces as great a proportion of the wings as possible, the engine units being mounted for pivotal movement about an athwartship axis 34. In low speed and hovering flight the engines and the air-screw axes will be disposed at a downward inclination, as shown in full lines, Fig. 6, substantially as shown in the diagrams, Figs. 3 and 4, while in high speed flight they may be adjusted so that they are substantially parallel to the axis of the fuselage and at a slight downward angle to the wing, as shown in dotted lines. Any suitable mechanism or gearing may be employed for varying the angle of the engines, as for instance arcuate racks 35 and pinions 36, as shown in dotted lines, Fig. 6, the pinions being mounted on a common shaft 37 extending to the cockpit where it may be rotated by the pilot.

The fuselage is provided at its end with a tail or empennage unit comprising a stabilizer 38, elevator 39, fins 40 and rudders 41, this unit having its major portions in the slip stream from the propeller, in a similar manner to the design illustrated in Figs. 3 and 4.

The wing 30 is provided at its forward edge with wing slot pilot planes 42 and at its trailing edge with inner flaps 43—43 and outer flaps 44—44, the latter in addition to being capable of moving with the inner flaps, being adapted to have independent movement so that they may function as ailerons. Any suitable known mechanism may be employed to operate these flaps. The pilot planes 42 are automatic in action and take the form of small aerofoils freely hinged about their centers of gravity and restrained only by stops at the two ends of the working range. In the high speed condition the pilot planes trail freely under the action of the air flow, and do no more than add resistance equal to the skin friction of the pilot planes themselves. In the low speed condition they come into contact with the upper stops and then act in a similar manner to slots to delay the stalling angle at large angles of incidence.

Figure 7:
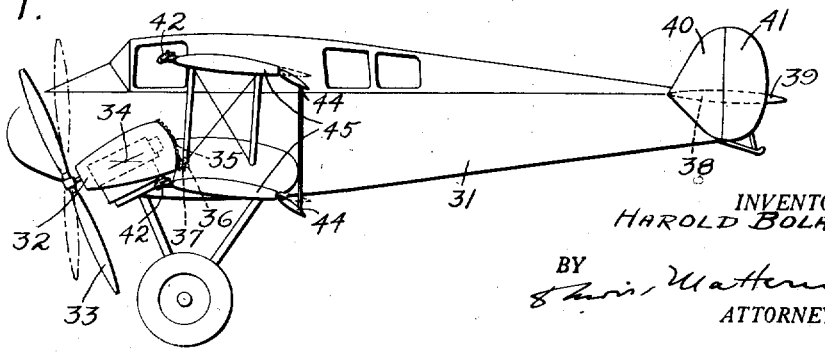
Fig. 7 is a side elevation, illustrating an aircraft of bi-plane type, embodying the invention.

In Fig. 7 I have illustrated a modification similar in general to that shown in Figs. 5 and 6 but in which the wing unit 45 is of bi-plane type, the engine units in this case being preferably arranged upon the upper side of the lower plane.

The engines 32 are preferably of light weight per horse power, and of geared down type, and the propellers are preferably variable pitch type operable by suitable means in flight.

Figure 8:
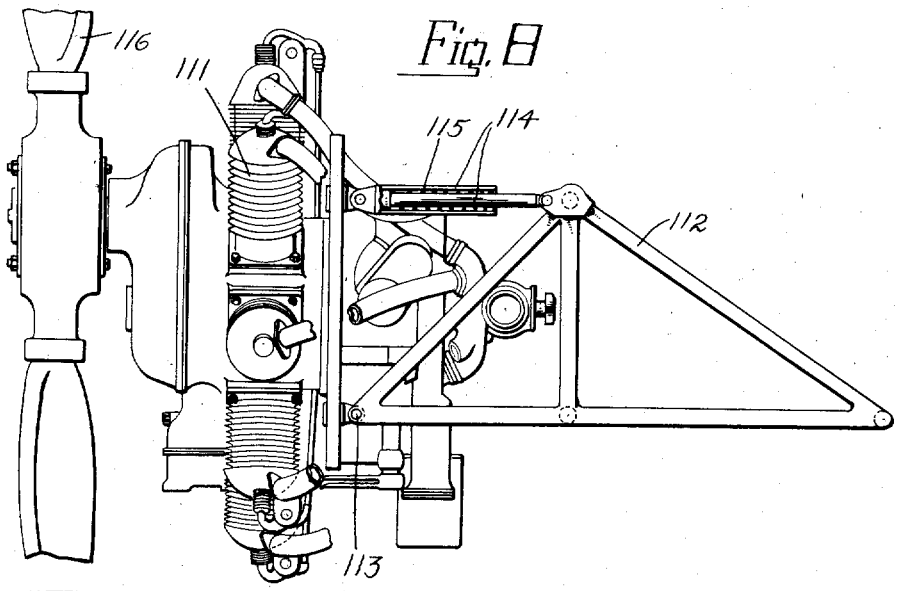
Fig. 8 is a side elevation of an engine spring mounting for automatically varying the propeller axis with variation of forward speed during flight.

In Fig. 8 I have shown an engine mounting for use in connection with embodiments of the invention where it is desired to automatically change the angular relation of the slip stream to the wing. The motor 111 illustrated is of radial type and is attached to the supporting structure 112 at four points, the two lower points 113 constituting a hinging axis. Elastic members 114 provided with internal compression springs 115 attach the upper points to the structure 112. The springs 115 are given an initial compression, so that at top speed or at any chosen speed the engine may be said to be in its normal position. As forward speed is reduced below the predetermined speed, the increasing thrust extends the members 114, thus inclining the air-screw axis downwards with respect to the wing and resulting in an increased angle of incidence between the slip stream and the wing. The air-screw 116 is shown as driven by reduction gearing.

Figure 9:
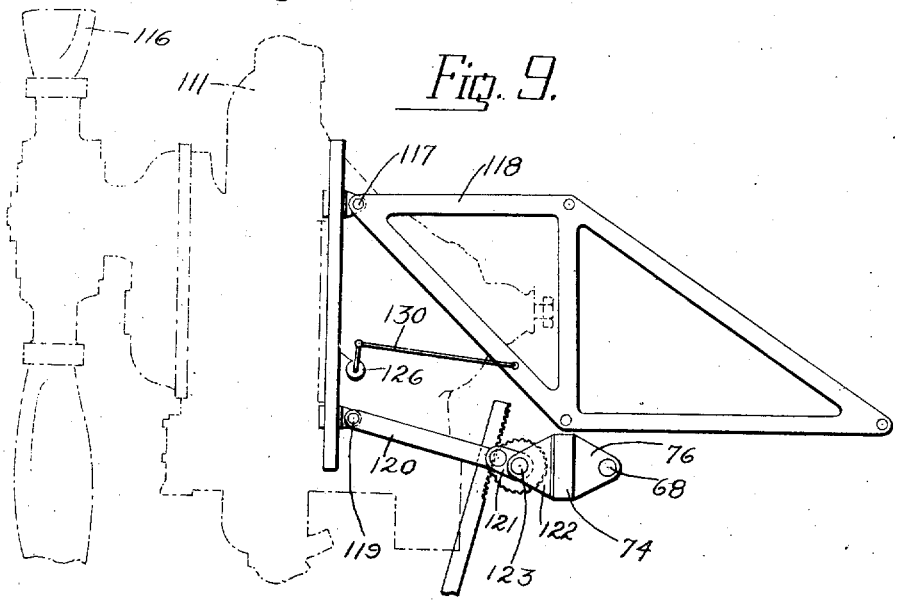
Fig. 9 is a side elevation of an alternative form of engine mounting, in which the angle between the propeller axis and main lifting surface is mechanically controlled.

In Fig. 9 I have shown an arrangement whereby angular adjustment of the engines is accomplished mechanically in conjunction with the gear provided for changing the relative angle between the wings and body. In this embodiment the two upper points of attachment 117 of the engine to the supporting structure 118 form the hinging axis, this arrangement being such as to reduce loads on the mechanism when operating. The engine 111 is of geared type having the air-screw axes above the center line of the engine. By hinging about the two upper points, the moments about the hinges due to air-screw thrust and engine weight act in opposite directions and can be made to substantially balance one another for some predetermined value of the thrust. The two lower attachment points 119 are connected by links 120 to a crank 121 arranged to rotate in bearings 122 which are preferably secured to the front spar 74 of the lower wing. The crank 121 is arranged to swivel through an angle of 180° so that the mechanism is toggled in the two extreme positions of the gear, and loads applied to the mountings are therefore not transmitted through the operating gear in these positions.

Figure 10:
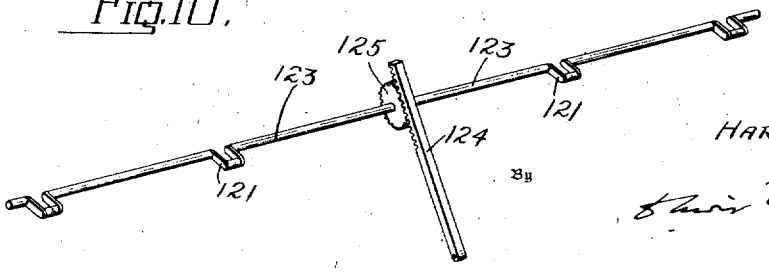
Fig. 10 is a perspective view of a shaft and gearing for operating the engine mountings as illustrated in Fig. 9.

As shown in Fig. 10 the cranks 121 for the several engines are connected together by co-axial shafts 123 having bearing in the bearings 122 secured to the front spar 74 of the wing, the whole being operated through a central rack 124 provided in the body and meshing with a pinion 125 secured centrally upon the shaft 123. The lower end of the rack 124 is pivotally connected to the body and it will be readily seen that relative motion of the body and wing about the axis 68 will rotate the pinion 125 and shaft 123 and procure the desired engine movement.

The means for varying the air-screw pitch can be of any suitable type, as for instance of the well known type in which the pitch change is effected by the operation of a two way cock acting on the oil pressure system of the engine.

Where movable engine units are employed, advantage may be taken of the movement of the engines relative to the wing to control the oil cocks. Such an arrangement is shown diagrammatically in Fig. 9 where the oil cock 126 mounted on the engine is connected by a link 130 to the structural support 118. Obviously relative movement of the engine causes the oil cock to be operated and the air-screw pitch varied.

I have illustrated and described preferred and satisfactory embodiments of my invention but it will be obvious that changes may be made therein, within the spirit and scope thereof, as defined in the appended claims.

Having thus described my invention, what I claim and desire to secure by Letters Patent is:—

1. In an aircraft, in combination, a body, a main wing, an empennage supported to the rear of said wing located in the airstream passing over said wing, lift increasing means for said wing which in operative position normally diverts the airstream downwardly, propeller means mounted ahead of the wing, and having its axis extending downwardly and forwardly relative to the chord of the wing, the slipstream from said propeller means passing over the wing and its lift increasing means whereby said slipstream causes the resultant airstream over the wing and its lift increasing means to bathe the empennage.

2. In an aircraft, in combination, a body, a main wing fixedly mounted thereon, an empennage carried by said body located in the airstream passing over said wing, lift increasing means for said wing which in operative position normally diverts the airstream downwardly, propeller means mounted ahead of the wing, and having its axis extending downwardly and forwardly relative to the chord of the wing, the slipstream from said propeller means passing over the wing and its lift increasing means whereby said slipstream raises the resultant airstream over the wing, and its lift increasing means to bathe the empennage.

3. In an aircraft, in combination, a body, a main wing fixedly mounted in relation to said body, an empennage carried by said body located in the airstream passing over said wing, lift increasing means for said wing which in operative position normally diverts the airstream downwardly, propeller means mounted ahead of the wing, and having its axis extending downwardly and forwardly relative to the chord of the wing, the slipstream from said propeller means passing over the wing and its lift increasing means whereby said slipstream raises the resultant airstream over the wing and its lift increasing means to bathe the empennage.

4. In an aircraft, in combination, a body, a main wing, an empennage supported to the rear of said wing located in the airstream passing over said wing, lift increasing means for said wing which in operative position normally diverts the airstream downwardly, propeller means mounted ahead of the wing, and having its axis extending downwardly and forwardly relative to the chord of the wing, the slipstream from said propeller means passing over the wing and its lift increasing means whereby said slipstream raises the resultant airstream over the wing and its lift increasing means to bathe the empennage.

5. In an aircraft, in combination, a body, a main wing, an empennage supported to the rear of said wing located in the airstream passing over said wing, lift increasing means for said wing which in operative position normally diverts the airstream downwardly, propeller means mounted ahead of the wing, and having its axis extending downwardly and forwardly relative to the chord of the wing, the slipstream from said propeller means passing over the upper and lower contours of said wing and its lift increasing means whereby said slipstream raises the resultant airstream over the wing and its lift increasing means to bathe the empennage.

6. In an aircraft, in combination, a body, a main wing, an empennage supported to the rear of said wing located in the airstream passing over said wing, lift increasing means for said wing which in operative position normally diverts the air-stream downwardly, propeller means mounted ahead of the wing, and having its axis extending downwardly and forwardly relative to the chord of the wing and to the longitudinal axis of the body, the slipstream from said propeller means passing over the wing and its lift increasing means whereby said slipstream raises the resultant airstream over the wing and its lift increasing means to bathe the empennage.

7. In an aircraft, in combination, a body, a main wing, an empennage supported to the rear of said wing located in the airstream passing over said wing, lift increasing means for said wing which in operative position normally diverts the airstream downwardly, propeller means mounted ahead of the wing, and having its axis extending downwardly and forwardly relative to the chord of the wing, the slipstream from said propeller means passing over the wing and its lift increasing means whereby said slipstream raises the resultant airstream over the wing and its lift increasing means to bathe a substantial portion of the empennage.

8. In an aircraft, in combination, a body, a main wing extending to each side of said body, an empennage supported to the rear of said wing located in the airstream passing over said wing, lift increasing means for said wing which in operative position normally diverts the airstream downwardly, a plurality of propeller means mounted ahead of the wing, at least one propeller means at each side of said body and having its axis extending downwardly and forwardly relative to the chord of the wing, the slipstream from said propeller means passing over the wing and its lift increasing means whereby said slipstream raises the resultant airstream over the wing and its lift increasing means to bathe the empennage.

9. In an aircraft, in combination, a body, a main wing, an empennage supported at the rear of said wing located in the airstream passing over a substantial portion of said wing, lift increasing means for said wing which in operative position normally diverts the airstream downwardly, propeller means mounted ahead of the wing, and having its axis extending downwardly and forwardly relative to the chord of the wing, the slipstream from said propeller means passing over the wing, and its lift increasing means whereby said slipstream raises the resultant airstream over the wing and its lift increasing means to bathe the empennage.

10. In an aircraft, in combination, a main supporting surface, an empennage mounted to the rear of said surface and located in the airstream passing over said supporting surface, lift increasing means for said supporting surface which in operative position normally diverts the airstream downwardly, propeller means mounted ahead of the supporting surface, and having its axis extending downwardly and forwardly relative to the chord of the supporting surface, the slipstream from said propeller means passing over the supporting surface and its lift increasing means whereby said slipstream raises the resultant airstream over the supporting surface and its lift increasing means to bathe the empennage.

HAROLD BOLAS.